United States Patent [19]

Weld

[11] 4,339,859

[45] Jul. 20, 1982

[54] WIRE SPOKE AUTOMOTIVE WHEEL MANUFACTURING METHOD

[75] Inventor: Richard G. Weld, Independence, Mo.

[73] Assignee: Weldwheels, Inc., Kansas City, Mo.

[21] Appl. No.: 178,795

[22] Filed: Aug. 18, 1980

Related U.S. Application Data

[63] Continuation-in-part of Ser. No. 918,606, Jun. 23, 1978, Pat. No. 4,226,479.

[51] Int. Cl.$^3$ .............................................. B21K 1/34
[52] U.S. Cl. .................................. 29/159.03; 301/67; 301/73; 301/74; 228/134
[58] Field of Search ........................ 29/159.02, 159.03; 301/66, 67, 104, 73, 74; 219/125.12; 228/134

[56] References Cited

U.S. PATENT DOCUMENTS

| | | | |
|---|---|---|---|
| 47,780 | 5/1865 | Murphy | 29/159.02 |
| 478,643 | 7/1892 | Scott | 29/159.02 |
| 1,355,234 | 10/1920 | Lachman | 301/67 |
| 2,042,714 | 6/1936 | Hunt | 301/67 |
| 3,365,926 | 1/1968 | Price | 72/370 |
| 3,441,710 | 4/1969 | Foulquier et al. | 219/125.12 |
| 4,226,478 | 10/1980 | Brown | 301/104 |

FOREIGN PATENT DOCUMENTS

| | | | |
|---|---|---|---|
| 2661 | of 1907 | United Kingdom | 72/327 |
| 338573 | 11/1930 | United Kingdom | 29/159.02 |
| 1367639 | 9/1974 | United Kingdom | 72/327 |

*Primary Examiner*—Lowell A. Larson
*Attorney, Agent, or Firm*—Fishburn, Gold & Litman

[57] ABSTRACT

A wire spoke, non-suspension type, automotive wheel is provided in which spokes are operably untensioned prior to vehicle loads being placed upon the wheel. An outer tubeless tire rim with a drop center is mounted to a wheel center. The wheel center includes a substantially thick and solid felly connected to a concentrically positioned hub. Wire spokes extend radially outward from the hub in a patterned circumferential array and have tenons or feet on inner ends thereof which are anchored within recesses at front and rear ends of the hub. Radially disposed outer ends of the spokes have plain terminations which are welded to form a plug anchor within circumferentially spaced bores in the felly to secure the spokes. The bores are preferably situated in inwardly extending dimples which are formed in the felly. The bores are partially frusto-conically shaped and are formed by a method using a circular punch and corresponding die. The punch is struck against the inner circumferential surface of the felly in an outward radial direction thereby punching out a chip such that the partially frusto-conical shaped bore remains. In an alternative method dimples can be added to the felly and nipples can be formed along the spokes to simulate suspension wire wheels. The method permits wheel formations which exhibit the classic beauty and elegance of a suspension wire spoke wheel, combined with durability, strength and ease of construction.

10 Claims, 9 Drawing Figures

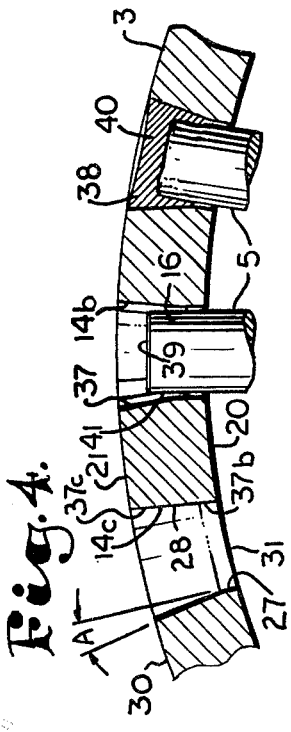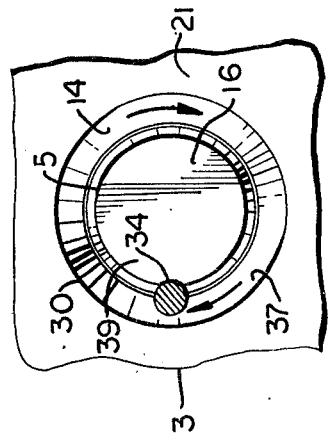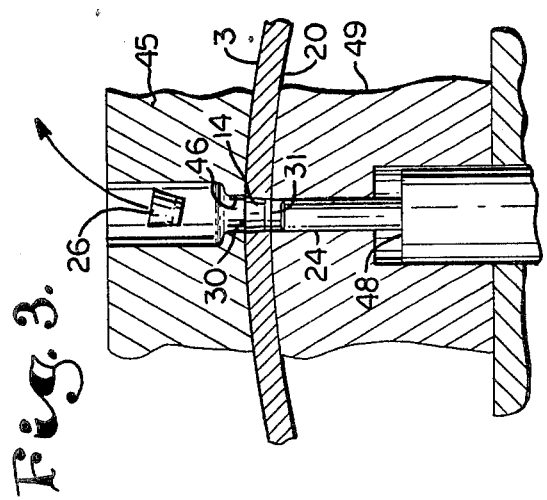

WIRE SPOKE AUTOMOTIVE WHEEL MANUFACTURING METHOD

CROSS-REFERENCE TO RELATED APPLICATIONS

The present application is a continuation-in-part of U.S. application Ser. No. 918,606, filed June 23, 1978, entitled WIRE SPOKE AUTOMOTIVE WHEEL, now U.S. Pat. No. 4,226,479 granted Oct. 7, 1981.

BACKGROUND OF THE INVENTION

This invention relates to wire spoke wheels and particularly to such wheels especially suitable for use with conventional tubeless tires and which are sturdy and durable.

Heretofore, wire spoke automobile wheels which permit the use of tubeless tires have been difficult and costly to construct. A typical method of manufacture resulted in the projection of wheel spoke nipple ends through holes in a rim drop center, which often interfered with maintaining a reliable and effective airtight seal in the tire. In an effort to overcome this seal problem, structures have been suggested utilizing spoke ends which are connected to a felly mounted concentrically inwardly of the rim drop center. This makes a reliable mounting for tubeless tires, but is often complex and expensive to produce. Further, neither arrangement effectively confronts the problems associated with the use of "suspension" type wire spoke wheels; namely, that suspension wire wheels must be originally tension aligned or "tuned" and are subject to subsequent slackening or "detuning" of spokes after periods of use or after striking resisting obstacles such as curbs, chuckholes and the like.

Moreover, the cost of manufacturing suspension wire wheels is inherently quite high because considerable handwork is required during the assembly and spoke tuning processes. Thus, a typical suspension conventional wire wheel may cost substantially more than a non-wire spoke and decorative wheel, while being less durable.

Within the past few years, certain automotive wheel manufacturers have attempted to overcome the problems associated with wire suspension wheels by employing relatively rigid and non-tensioned bars extending radially between the hub and rim. Though functionally effective, these bars are generally substantially heavier or thicker than wire wheels and have not had the consumer demand of conventional suspension wire spoke wheels.

As referred to in this application the phrases "suspension" wire wheels and "tensioned" wire wheels signify a wire wheel having a rim and a hub with the rim floating inside the hub on wire spokes that are operably tensioned. The tension in each individual spoke can and must be adjusted to tune the wheel.

The phrases "non-tensioned" wire spoke wheel, "untensioned" wheel, and "non-suspension" wheel signify a wheel having a rim and hub wherein the hub is supported by rigid non adjustable spokes which are positioned between the hub and the rim. The spokes in this style of wheel encounter no axial forces prior to the supporting of any weight by the wheel. In the "suspension" type wire wheel there exists an axial tensile force in the spokes while the wheel is in an unloaded condition.

In general the wire wheel assembly of the present invention has been extensively described in the previously mentioned parent applications of the present application and the disclosure contained in those parent applications is included herein by reference. In the parent applications a wheel is described wherein a felly was mounted concentrically inward of the rim drop center in conjunction with operably untensioned spokes which are partially recessed into bores placed circumferentially around the felly. The bores have an inner section and an outer section with the outer section having a greater diameter than the inner section, thereby forming a shoulder at their juncture. The outer end of each spoke is placed in a respective bore so as to extend radially into the felly to the shoulder. The spokes are then anchored to the felly by an electric current welding process, the accumulation from which forms a plug anchor on the outer end of the spokes which plug is of a larger diameter than the diameter of the inner section of the bore thereby preventing the spoke from being pulled inwardly relative to the felly toward the wheel hub. After the felly is secured to the rim, the spoke is prohibited from movement outwardly relative to the felly by the rim.

While the above described method of manufacturing such a wheel produces a high quality and consumer acceptable wheel, the process of drilling and counter drilling the bores tends to be labor intensive.

Also, previous untensioned wheels have typically not had the exact appearance of the suspension wire wheel in that suspension wire wheels historically have had dimples extending inwardly from the rim at a position whereat the outer end of the spoke is attached to the rim. In suspension type wheels, the dimples are utilized to form a pocket or receptacle for an associated nipple which holds the spoke onto the suspension type rim so that the nipple does not extend radially outwardly from the rim and interfer with forming a seal between the rim and a tire. Thus, in suspension wheels the nipple is located in an associated inwardly projecting dimple which positions the top of the nipple flush with remainder of the rim. A substance is placed inside the rim to seal same, therefore making the sealing of a tire on such a rim much easier.

In addition, prior operably untensioned spoke wheels have typically differed in appearance from suspension wire wheels in that exterior portions of the nipples which hold the ends of the spokes to the rim are threadably attached to respective spokes and have flats on the outer circumferential surface thereof which allow the nipple to be tuned by a suitable tool thereby loosening or tightening the spoke. In general, previous non-suspension spoke wheels have not provided for nipples flats, with the result of reducing customer satisfaction in the appearance of such wheels.

SUMMARY OF THE INVENTION

Therefore, the principal objects of the present invention are: to provide a wire spoke wheel for tubeless tires having the appearance advantages of wire suspension wheels without many of the functional disadvantages; to provide such a wire spoke wheel that utilizes untensioned spokes and has the appearance of a wire suspension wheel; to provide a spoke to be used in untensioned wire spoke wheels that has the appearance of spokes used in wire suspension wheels and which are easily constructed; to provide a felly for use with untensioned wire spoke wheels which has the appearance of a felly which is used in wire suspension wheels; to provide a method of producing such a wire wheel having the spokes and a felly wherein the spokes are secured to the felly in a relatively strong manner utilizing relatively little labor; to provide such a method wherein a punch is utilized against an inner surface of the felly in an outward radial direction to remove a partially frusto-conical shaped plug from the felly thereby creating a partially frusto-conical shaped bore therein; to provide such a method wherein each spoke is inserted in a respective bore and welded therein such that each spoke is securely held within the felly; and to provide a wire spoke wheel which is relatively inexpensive to produce, sturdy and durable in use and adaptable to forms having particular beauty and consumer demand.

Other objects and advantages of this invention will become apparent from the following description taken in connection with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is a fragmentary cross-sectional view of the wheel illustrating a step in the manufacture thereof wherein a portion of the felly is secured to a punch and die unit which is utilized to remove a partially frusto-conical plug from the felly.

FIG. 4 is a greatly enlarged, fragmentary cross-sectional view of the wheel illustrating several steps in the manufacture thereof wherein one of the spoke outer ends is inserted into a felly bore and then welded to secure both together.

FIG. 5 is a greatly enlarged fragmentary cross-sectional view of the wheel illustrating a step in manufacture thereof wherein welding apparatus is utilized to weld one of the spokes to the felly.

FIG. 6 is a greatly enlarged cross-sectional fragmentary view of the wheel taken along line 6—6 of FIG. 5, showing the path taken by the welding apparatus during welding of a spoke.

DETAILED DESCRIPTION OF THE PREFERRED EMBODIMENT

Figure 1:
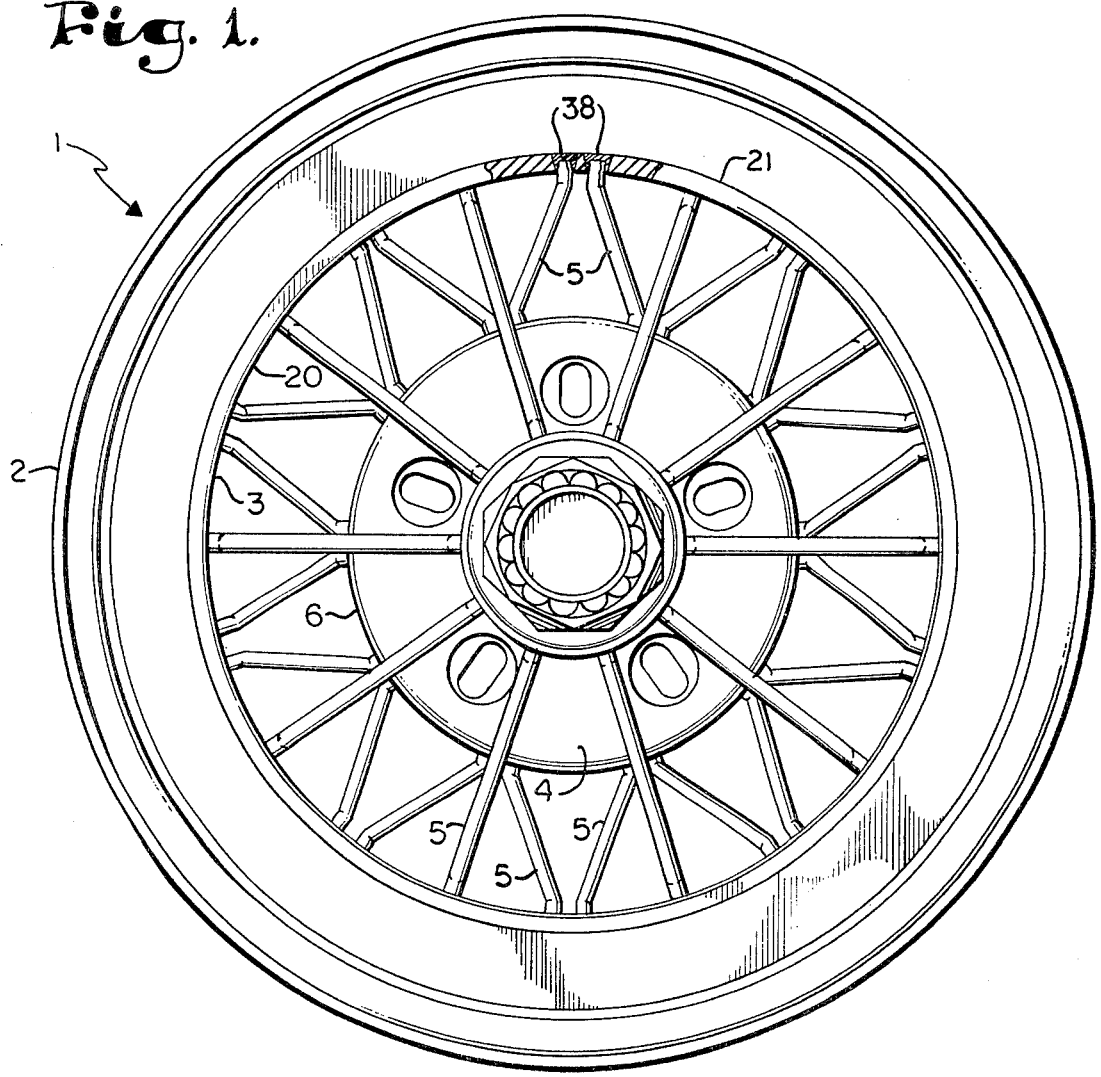
FIG. 1 is a front elevational view of a wire spoke wheel embodying the present invention having a rim with a drop center, a felly and spokes.
Figure 2:
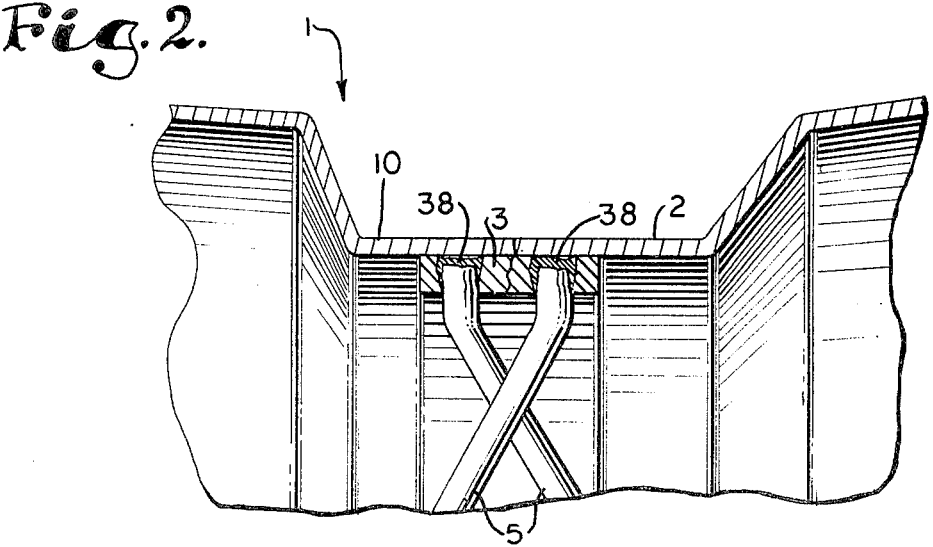
FIG. 2 is an enlarged fragmentary vertical cross-sectional view of the drop center, the felly, and outer ends of spokes.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally indicates an untensioned wire spoke wheel. The present invention can be adapted for use on a variety of untensioned wire spoke wheels, however, a suitable wheel is disclosed in detail in the present applicant's application for U.S. patent, Ser. No. 918,606, filed June 23, 1978. The wheel 1 includes an outer tubular tire rim 2, a felly 3 mounted concentrically inwardly of the rim 2. Operably untensioned wire spokes 5 interconnect the hub assembly 4 and the felly 3 in a circumferential array and therewith form a wheel center 6 which is connected to the tire rim 2.

The felly 3 is mounted concentrically inwardly of a drop center 10 and, in this embodiment is formed from a length of solid, rolled, steel welded into a hoop, providing strength and rigidity for the wheel 1. Before assembly of the wheel 1, a plurality of bores 14 extend at circumferentially spaced locations around and radially through the felly 3 for receiving and anchoring radially outer ends 16 of the spokes 5 as described below. The felly 3 has annularly arranged inner and outer generally cylindrical surfaces 20 and 21 respectively. The felly outer surface 21 conforms to and is attached by welding or the like to an inner side of the drop center 10 after the spokes 5 are secured therein.

The bores 14 extend through the felly 3 from the inner surface 20 to the outer surface 21. The bores 14 are unsymmetrical along a radial axis and as shown herein are frusto-conical in shape having a diameter which is associated with the felly outer surface 21 which is greater than the bore diameter associated with the felly inner surface 20.

The present invention describes a method used to fabricate the bores 14 in the felly 3. In the present applicant's related application, Ser. No. 918,606, the fabrication of bores therein comprises the drilling of two portions, an inner portion and an outer portion, of differing diameters with the outer diameter being greater than the inner diameter.

With reference to FIG. 3 which shows a step in the manufacture of the felly 3, it has been found that if a circular punch 24 is placed adjacent to the felly inner surface 20 and forcibly applied thereto, a chip or plug 26 is punched out of the felly 3 and will be generally frusto-conical in shape, therefore leaving in general a frusto-conical bore, such as the illustrated bore 14 in the felly 3, having a radially outer opening 30 with a diameter thereof which is greater than a diameter of a radially inner opening 31. Thus, punching is initiated against the felly interior or inner surface 20.

In a further step in the manufacture of the wheel 1 the radially outer end of the spoke 16 is extended to a position approximately ⅔ of the way into the conical bore from the felly inner surface 20 to the outer felly circumferential surface 21 as is shown in the middle bore 14b of FIG. 4 (Note an empty bore 14 which has not had a spoke inserted therein is shown as a left bore 14c in FIG. 4). In a next step in the wheel manufacture the spoke outer ends 16 are then anchored within a respective bore 14 by an electric current welding process utilizing, for example, a partly illustrated bead welding device 32. The welding device 32 includes a hollow casing feeder 33 from which is fed a welding wire 34 of mild steel or the like. The welding device 32 is part of a larger apparatus (not shown) which causes the welding wire 34 to rotate whereby the wire distal end traverses a circular path (see arrow in FIG. 6) as it continuously extends into a respective bore 14. In the illustrated example, the welding wire 34 is approximately of 0.035 diameter and is selectively fed from the tip 35 of the welding device 32. Additionally, a circular channel 36 on the welding device 32 which rings the welding wire 34, transmits therealong a gas mixture, such as 95 percent argon and 5 percent carbon dioxide, which acts as an inert shield around the welding wire 34 to avoid contamination of the weld.

In forming the weld, the welding wire 34 is inserted into each of the bores 14 from the outer surface 21 to a position between the outer end 16 of a respective spoke 5 and a wall portion of the bore 14 and then moved in the noted circular pattern to produce a "rosette" or coiled and circular bead weld formation 38 atop a respective spoke outer end 16 and between the spoke outer end 16 and the bore wall 37, as illustrated with respect to the right spoke 5 in FIG. 4. The weld formation 38 is fused to a top of the spoke surface 39, a spoke outer end circumferential surface 41, and the wall 37 of the bore and roughly constitutes a plug 40 which with the spoke 5 fills the cavity of the associated bore 14 and blends with adjacent surfaces of the felly 3. The fused or blended portion of the weld tends to extend substantially into the material of the felly 3 and spoke outer end 16 and securely anchor each spoke 5 within the felly 3 against radially outward and especially radially inward forces. In particular the formation 38 is also wider than the felly inner opening 31 so as to prevent an associated spoke 5 from being pulled from the felly 3.

A typical device used to fabricate the frusto-conical bores 14 is shown in FIG. 3. The felly 3 is firmly attached to a jig (not shown). An arcuate die 45 having a circular normal channel or bore 46 therein of a size sufficient to allow the projection therethrough of the chip 26 is securely placed adjacent the felly outer surface 21 of the felly 3, such that the bore 46 coaxially aligns with the desired location of one of the felly bores 14. A hydraulic ram press or the like such as piston 48 reciprocates in mold 49 has the punch 24 attached thereto. The punch 24 has a generally circular cross section of a diameter generally commensurate with the diameter of the spoke outer end 16 and substantially less than die bore 46. The punch is placed adjacent to the inner surface 20 at a circumferential position radially inward from the corresponding die bore 46. The mold 49 generally conforms to the interior surface 21 of the felly 3. Extension of the piston 48 against the felly 3 punches the chip 26 from the felly 3, the chip 26 passing through the die bore 46.

The ratio of the outer bore diameter 30 to the inner bore diameter 31 is a function of the thickness of the felly and the type of material comprising the felly. It has been found that for a given material a cone angle A, FIG. 4, which is the angle of divergence of the bore outer portion 28 with respect to the bore inner portion 27, will remain substantially the same.

Preferably, the metal used to fabricate the felly is the 10xx series of carbon steel which is hot rolled to form the felly and is pickled or dipped in oil to remove or prevent scaling. It has been found when using the above described method to punch the plug 26 from the felly 3 that the remaining bore 14 compresses two portions, FIG. 4, an inner portion 27 and an outer portion 28. The inner portion 27 is such that an inner portion bore wall 37b is substantially normal to the inner cylindrical surface 20 of the felly and generally extends approximately ¼ of the way into the felly from the point of initiation of the punch. An outer portion bore wall 37c generally diverges or tapers outwardly such that the outer bore diameter 30 is greater than the inner bore diameter 31.

Particularly it has been found that when using a punch 24 of 0.305 inches diameter on a felly of approximately 0.240 inches thick the outer bore diameter 30 will range from approximately 0.330 to approximately 0.360 inches in diameter depending on the carbon content of the material of construction.

Specifically, when using 1008 carbon steel the outer bore diameter 30 will be about 0.360 inches. Further, when using a punch 24 of 0.395 inches in diameter and a felly of approximately 0.340 inches thick made of 1008 carbon steel the outer bore diameter 30 will be approximately 0.465 inches in diameter.

It is desirable to have an outer bore diameter 30 as large as possible relative to the inner bore diameter 31 to facilitate the placement between the outer portion bore wall 37c and the spoke outer end circumferential surface 40 of a maximum amount of weld formation 38. In this manner the interstructure formed between the felly 3, the spoke 5, and bore wall 37c after welding will tend to resist movement of the spoke 5 radially inward relative to the felly 3.

Thus, when the felly 3 is annular and formed of 10xx series carbon steel, the diameter of the punch 24 is 0.305 inches and the felly 3 is approximately 0.240 inches thick, the ratio of the outer bore diameter 30 with respect to the inner bore diameter 31 is in the nature of from 1.08 to 1.18 with the outer bore diameter 30 being larger than the inner bore diameter 31. Further, when using 10xx series carbon steel the cone angle A, is preferably of a range of from two to nine degrees.

Considering the above, when a 0.305 inch diameter punch is being used the die bore 46 must be greater than 0.360 inches and likewise when using a 0.390 inch diameter punch the die bore 46 must be greater than 0.465 inches.

The reference numeral 1a (FIGS. 7 through 9) generally represents a second embodiment of a wheel, according to the present invention. Since the wheel 1a except for modifications to the spokes and felly thereof is otherwise substantially the same as the previously described wheel 1, similar parts appearing in FIGS. 7 through 9 and FIGS. 1 through 6 respectively are represented by the same corresponding reference numeral except for the addition of the suffix "a" to the numerals of the modified device. In particular the wheel 1a includes an outer tubular tire rim 2a, a felly 3a mounted interior of the rim 2a and an inner hub assembly (not shown). Wire spokes 58 interconnect the felly 3a and hub assembly. The felly 3a before interconnection with the spokes 58 has a plurality of generally radially arranged partially frusto-conically shaped bores 14a therethrough, each of the bores 14a being associated with a respective spoke 58.

Figure 7:
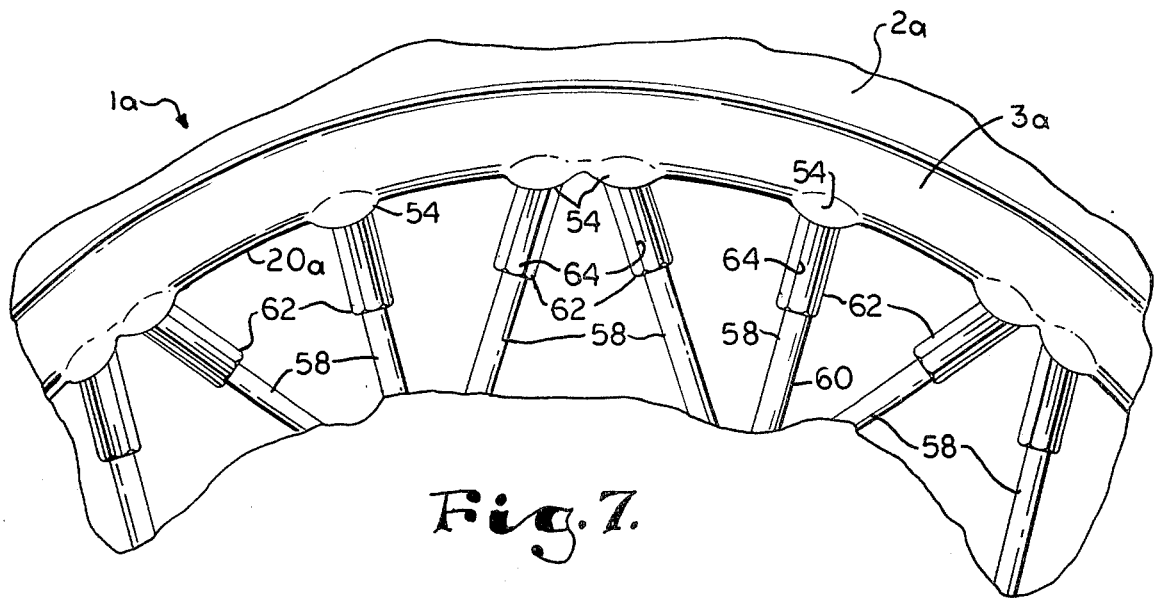
FIG. 7 is a fragmentary front elevational view of a modified embodiment of a wheel showing dimples on the felly and simulated nipples with flats on outer ends of spokes.
Figure 8:
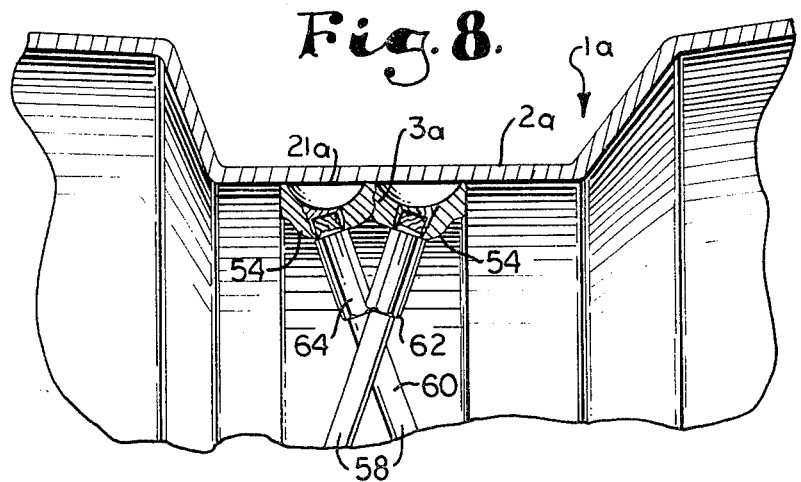
FIG. 8 is an enlarged fragmentary vertical cross-sectional view of the modified embodiment of the wheel, shown in FIG. 7, showing the drop-center, the felly, dimples, and simulated nipples with flats on outer ends of the spokes.
Figure 9:
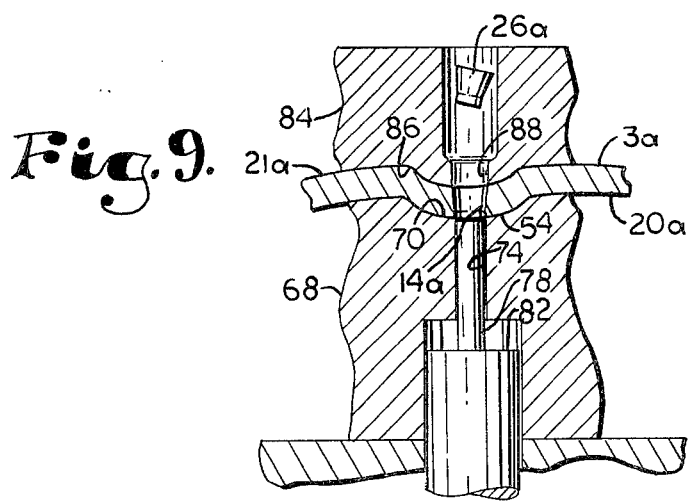
FIG. 9 is a fragmentary cross-sectional view of the modified embodiment of the wheel illustrating a step in the manufacture thereof wherein a portion of the felly is secured to a punch and die unit which is used to form the dimples and remove a partially frusto-conical piece from the felly.

In the alternate embodiment as shown in FIGS. 7–9, prior to the fabrication of the bores 14a, a plurality of inwardly extending dimples 54 are formed in the felly 3 such that one dimple 54 is approximately centered whereat the bore 14a will be positioned. Each dimple 54 is formed to more thoroughly simulate wire suspension wheels which necessarily have similar dimples.

In the alternate embodiment each spoke 58 further simulates a tensioned wire wheel spoke, by having a shank portion 60, a simulated nipple portion 62 of greater cross-sectional diameter than the shank portion 60, and flat recesses 64 positioned on the nipple portion 62 to simulate wrench lugs for adjusting tension on conventional spokes.

A variety of devices may be utilized to form the dimples 54. One such device is shown in FIG. 9. This device also combines structure that is used to fabricate the bore 14a. Referring to FIG. 9, a process for manufacturing the felly 3a of the alternative wheel 1a is initiated by securing the felly 3a in a jig (not shown). A female dimple die 68 having a substantially concave spherical platen surface 70 is stationarily positioned in the jig adjacent an inner surface 20a of the felly 3a. The female die 68 has a first circular bore 74 positioned generally normal to the spherical platen surface 70. A circular punch 78 is provided of such diameter that is commensurate with a diameter of the felly bores 14a at the inner surface 20a is attached to a reciprocal bore piston 82. The circular punch 78 is positioned and reciprocates in the first circular bore 74 relative to the felly 3a when the piston 82 is placed thereagainst. It is noted that some of the spoke receiving felly bores 14a are not perpendicular to the felly 3a. Fabricating these bores would require a female die and punch (not shown) having first circular bores (not shown) therethrough which mate with the felly 3a at the desired angle. A male dimple die 84 having a convex or inwardly extending, substantially spherical punch surface 86 commensurate in shape and size for receiving the female die platen surface 70 therein is circumferentially positioned at a point adjacent an outer surface 21a of the felly 3a such that the hemispherical surface 86 of the male dimple die 84 extends inwardly at a circumferential position radially outward of the platen surface 70 of the female dimple die 68. The male dimple die 84 has a circular bore 88 therein of a diameter commensurate with the widest diameter of a plug 26a that is to be punched from the felly 3a by the circular punch 78.

To form the dimple 54, the dimple die 84 is forcibly applied to the felly outer surface 21a by sufficient pressure means (not shown) to deform the felly 3a in the shape of the dies 68 and 84 on respective sides thereof. The male dimple die 84 is then forcibly held against the felly outer surface 21a while the circular punch 78 is forcibly applied to the felly inner surface 20a thereby punching out the chip or plug 28 which is generally frusto-conical in shape. The dies 68 and 84 are then removed and the spokes 58 are attached to respective bores 14a in the felly 3a in the same manner as in the previous embodiment.

It should be noted that the method of fabricating spoke-receptive bores as set out herein is not limited to be used on the felly 3a. If a hub has a large enough inside diameter to allow the placement therein of a welding tool, the manner of connecting the outer ends of the spokes 58 to the felly 3a may likewise be utilized to connect inner ends of spokes to a hub.

It is to be understood that while certain forms of the present invention have been illustrated and described herein, it is not to be limited to the specific forms or arrangement of parts herein described and shown.

What is claimed and desired to secure by Letters Patent is:

1. In the manufacture of a wire spoke automotive wheel having a felly with spaced spoke receiving bores extending circumferentially therearound and spokes having radially outer ends and each having an associated felly bore, a method of producing said bores and securing said spoke outer ends within said bores comprising the steps of:
   (a) securing a die having at least one channel therethrough to the outer circumferential surface of the felly;
   (b) placing a circular punch adjacent the inner circumferential surface of the felly at a point radially inward from a corresponding channel in the die, said punch being of substantially smaller diameter than said channel;
   (c) punching a plug out of the felly by forcibly applying the punch to the inner circumferential surface of the felly whereby the bore punched in the felly has a generally frusto-conical shape such that an outer circumferential dimension of the bore is larger than a corresponding inner circumferential dimension;
   (d) inserting a spoke outer end having a side surface partially within a felly bore, thereby leaving a cavity within said felly bore atop said spoke outer end, said spoke side surface being spaced from said bore wall; and
   (e) feeding a welding wire into said cavity under wire melting conditions thereby producing a weld formation fused to said spoke outer end, side surface, and felly.

2. The method as set forth in claim 1, wherein an inwardly projecting, concave and substantially spherical dimple is formed on the inner circumferential surface of said felly around the bore and including the steps of:
   (1) securing a female dimple die having a radially inwardly projecting substantially spherical platen surface to the inside circumferential surface of the felly at the desired circumferential position;
   (2) placing a radially inwardly projecting substantially spherical male dimple die adjacent the outer circumferential surface of the felly at a position radially outward from said first die;
   (3) forcibly applying said male die to said felly thereby forming an inwardly projecting substantially spherical dimple in the felly at a desired circumferential position.

3. The method as set forth in claim 1, including the step of:
   (a) substantially filling said cavity with said weld formation.

4. The method as set forth in claim 1, including the step of:
   (a) moving said wire in a circular path within said cavity while feeding said wire.

5. The method as set forth in claim 2, wherein:
   (a) said circular punch reciprocates within said female dimple die and said male dimple die contains therein said channel.

6. In the manufacture of a wire spoke automotive wheel having a felly with spaced spoke receiving bores extending circumferentially therearound and spokes having radially outer ends and an associated felly bore, a method of producing said bores and securing said spoke outer ends within said bores comprising the steps of:
(a) providing a die having at least one channel therethrough and positioning said die in abutment with the outer circumferential surface of the felly;
(b) placing a circular punch adjacent the inner circumferential surface of the felly at a point radially inward from a corresponding channel in the die, said punch being of substantially smaller diameter than said channel and in registration therewith;
(c) punching a frusto-conical plug out of the felly by forcibly applying the punch to the inner circumferential surface of the felly whereby the bore having a wall thereof punched in the felly has a generally frusto-conical shape such that an outer circumferential dimension of the bore is larger than a corresponding inner circumferential dimension;
(d) inserting a spoke outer end having a side circumferential surface and an end surface thereof partially within a felly bore, leaving a cavity within said felly bore atop said spoke outer end surface, said spoke side circumferential surface spaced from said bore wall; and
(e) feeding a welding wire into said cavity between said spoke outer circumferential surface and said bore wall under wire melting conditions thereby producing a weld formation fused to said spoke outer end surface and felly including said spoke side circumferential surface and said bore wall.

7. A method as set forth in claim 6 wherein:
(a) said punch has a diameter of approximately 0.305 inches and the thickness of said felly is approximately 0.240 inches; and
(b) a ratio exists between an outer diameter of said bore with respect to an inner diameter of said bore which is in the nature of from 1.08 to 1.18 such that the outer diameter is larger than the inner diameter.

8. A method as set forth in claim 7 wherein:
(a) said felly is 0.240 inches thick and made of 1008 carbon steel; and
(b) said ratio is approximately 1.18.

9. A method as set forth in claim 6 wherein:
(a) said felly is formed of 10$xx$ carbon steel; and
(b) said bore has a cone angle in the range of from 2° to 9°.

10. A method of securing an end of an automotive wheel spoke having a circumferential surface and an axial end surface, to an annular felly comprising the steps of:
(a) punching a bore through said felly with a punch of larger diameter than said spoke end, said punching being initiated from the interior surface of said felly;
(b) supporting said felly with a die at the exterior surface of said felly during said punching, said die having a bore aligned with said punch and of sufficiently greater diameter than said punch whereby the plug produced by said punching is of a generally frusto-conical shape and said felly bore is correspondingly of a generally frusto-conical shape after ejection of said plug through said die bore by said punch;
(c) inserting said spoke end partially through said felly bore from said interior surface thereby creating a cavity formed by said spoke axial end surface and a wall of said felly bore; and
(d) inserting a welding wire into said cavity under high heat conditions whereby said wire, said spoke end, and said felly bore are fused together producing a rigid and secure interstructure.

* * * * *